May 21, 1935.  C. J. McKENNA  2,002,037
SUPPORT FOR ELECTRIC BATTERIES UNDERGOING CHARGING
Filed April 29, 1932
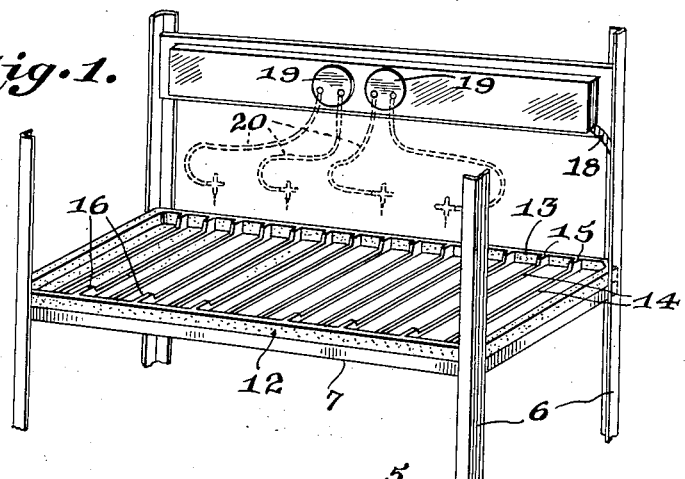
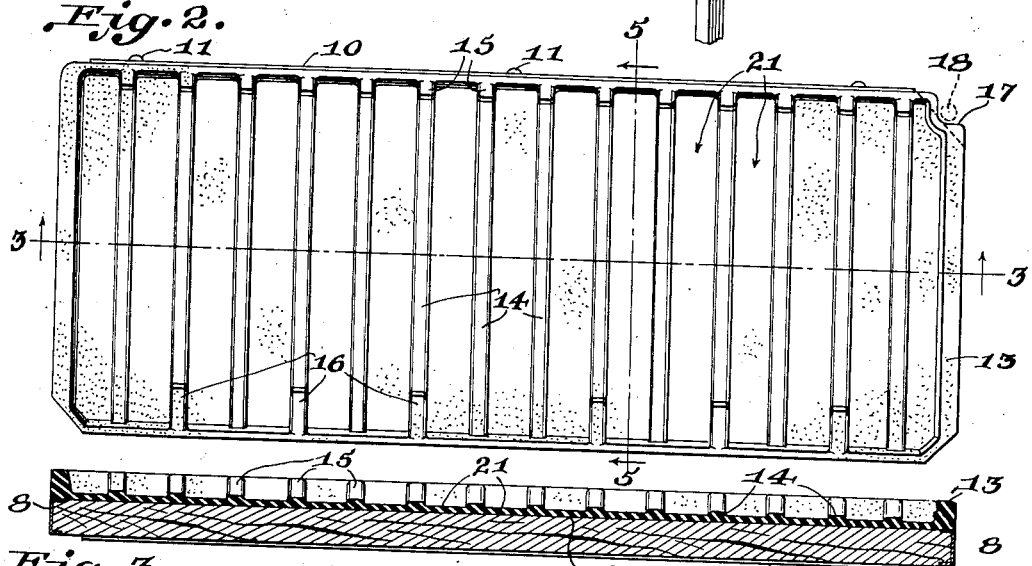
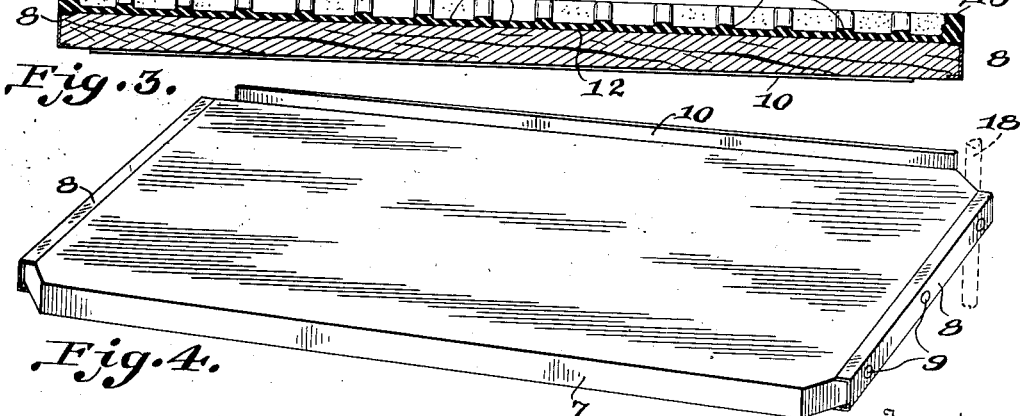
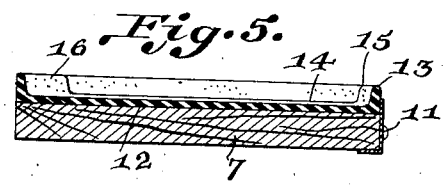
Inventor
Charles J. McKenna
By Seymour T Bright
Attorneys Patented May 21, 1935

2,002,037

UNITED STATES PATENT OFFICE 2,002,037

SUPPORT FOR ELECTRIC BATTERIES UNDERGOING CHARGING

Charles J. McKenna, Newark, N. J., assignor to Atlas Supply Company, Newark, N. J., a corporation of Delaware Application April 29, 1932, Serial No. 608,338

3 Claims. (Cl. 136—173)

This invention relates to improvements in supports for electric batteries undergoing charging, and more especially to a novel tray and its supporting shelf.

One of the objects of the invention is to provide a battery charging rack including a special shelf of wood or the like, reinforced with metal to prevent warping, and provided with a tray stop.

Another object is to furnish a battery supporting tray designed to rest on such a shelf, and formed of vulcanized rubber or the like which will not be affected by the electrolyte of storage batteries which are placed on the tray during charging.

A further object is to supply a tray for this purpose, having special ridges and abutments to support a battery elevated above any dripping electrolyte, and adapted to keep the battery in such position as to prevent electrolyte from overflowing the tray on to the shelf.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a perspective view of a portion of a battery charging rack with my improvements applied thereto.

Fig. 2 is a top plan view of the tray and shelf forming the subject matter of the invention.

Fig. 3 is a vertical sectional view of the same, taken on the line 3—3 of Fig. 2.

Fig. 4 is a perspective view of the shelf.

Fig. 5 is a transverse sectional view of the shelf and tray assembly, taken on the line 5—5 of Fig. 2.

Referring to the drawing, 6 designates the legs or uprights of a conventional battery charging rack which supports shelves 7, only one of which is shown.

In accordance with the invention, I prefer to make the shelf 7 of wood or the like, and to prevent warping, I reinforce its ends by channel-shaped metal bars 8 which are secured to the shelf by any suitable means such as nails 9.

At one side edge of the shelf, I place an L-shaped bar 10 which projects above the surface of the shelf, and is secured to the latter by nails 11 or the like. The bar 10 forms a stop at one edge of the shelf to limit the movement in one direction, of a special tray 12. This tray is preferably composed of vulcanized rubber or other material which is not affected by storage battery electrolyte, and it has an upstanding annular wall 13. Ridges or the like 14, of less height than the wall, project upwardly from the bottom of the tray and extend transversely of the tray. Lugs 15, integral with the wall, and ridges 14, are of the same height as the wall, and they form abutments at one edge portion of the tray to limit the movement in one direction of batteries supported by the tray.

Other lugs 16 at the opposite edge portion of the tray, are integral with alternate ones of the ridges 14, and with the wall 13, and they form abutments also for the batteries to prevent shifting in one direction. As the lugs 15 and 16 project toward one another, it will be understood that they space opposite sides of a battery from opposite edges of the tray, and consequently, any overflowing electrolyte will be deposited in the tray and will not pass over the edge or wall of the tray.

A notch 17 at one corner of the tray allows the current cable 18 to pass up one leg of the rack to the instruments 19 of the rack, from which the wires 20 extend. These wires, as is usual, are attached to the terminals of the batteries while the latter rest on the tray for charging purposes.

During charging it will be understood that overflowing electrolyte will be precipitated into the grooves 21 between the ridges of the tray, and that the ridges will prevent a battery from resting in the electrolyte caught by the tray.

As the tray is not fastened to the shelf, it will be understood that it can be readily lifted off the rack for disposing of the electrolyte and for washing the tray.

A wood shelf is not affected by electrolyte as much as a metal shelf would be, but it is liable to warp, and I prevent this disadvantage by using the reinforcing bars 8 and 10.

From the foregoing it is believed that the construction and advantages of the invention may be readily understood, and it is apparent that changes may be made in the details disclosed, without departing from the spirit of the invention, as expressed in the claims.

What is claimed and desired to be secured by Letters Patent is:

1. In a battery charging rack, a shallow battery supporting tray having a plane under surface formed of a material which is not affected by storage battery electrolyte, said tray having a low upstanding annular wall and battery supporting projections extending upwardly from the bottom of the tray and positioned within the boundary formed by the wall, said projections forming parallel ridges connecting opposite sides of the wall, and battery stop lugs projecting toward one another from opposite sides of the wall.

2. A shallow tray for use in charging batteries formed of a material which is not affected by storage battery electrolyte and including a bottom having a plane under surface, a low upstanding annular wall projecting upwardly from the edge portions of the bottom, transversely extending spaced ridges on the bottom of less height than the wall and connecting opposite sides of the latter, and battery stop lugs projecting toward one another from the last mentioned sides of the wall and united with said ridges.

3. The combination with a battery charging rack having a shelf provided with a flat upper surface, of a shallow battery supporting tray having a plane under surface adapted to rest on said shelf, said tray being formed of a material which is not affected by storage battery electrolyte, and having a short upstanding annular wall, battery supporting projections extending upwardly from the bottom of the tray and positioned within the boundary formed by the wall, and battery stop lugs projecting toward one another from opposite sides of the wall and united with said projections.

CHARLES J. McKENNA.